United States Patent
Lin et al.

(10) Patent No.: US 11,006,421 B2
(45) Date of Patent: May 11, 2021

(54) METHOD AND APPARATUS FOR IMPROVING BEAM FINDING IN A WIRELESS COMMUNICATION SYSTEM

(71) Applicant: ASUSTeK Computer Inc., Taipei (TW)

(72) Inventors: Ko-Chiang Lin, Taipei (TW); Richard Lee-Chee Kuo, Taipei (TW)

(73) Assignee: ASUSTek Computer Inc., Taipei (TW)

(*) Notice: Subject to any disclaimer, the term of this patent is extended or adjusted under 35 U.S.C. 154(b) by 1080 days.

(21) Appl. No.: 15/005,540

(22) Filed: Jan. 25, 2016

(65) Prior Publication Data

US 2016/0219571 A1  Jul. 28, 2016

Related U.S. Application Data

(60) Provisional application No. 62/107,937, filed on Jan. 26, 2015, provisional application No. 62/107,945, filed on Jan. 26, 2015.

(51) Int. Cl.
  *H04W 72/04*   (2009.01)
  *H04W 74/08*   (2009.01)
  (Continued)

(52) U.S. Cl.
  CPC ......... *H04W 72/046* (2013.01); *H04W 24/02* (2013.01); *H04W 52/04* (2013.01);
  (Continued)

(58) Field of Classification Search
  CPC ... H04W 24/02; H04W 52/04; H04W 72/046; H04W 72/0473; H04W 74/006; H04W 74/0833; H04W 88/02; H04W 88/08
  (Continued)

(56) References Cited

U.S. PATENT DOCUMENTS 6,208,858 B1 *  3/2001  Antonio ............. H04B 7/18534
  370/331
2009/0143073 A1  6/2009  Hovers et al.
  (Continued)

FOREIGN PATENT DOCUMENTS

JP    2013183377     9/2013
KR   10-2013-0045223  5/2013
KR   10-2015-0000304  1/2015

OTHER PUBLICATIONS

Office Action from the Japanese Patent Office in the corresponding Japanese Patent Application No. 2016-011408, dated Jan. 24, 2017.
(Continued)

*Primary Examiner* — Omar J Ghowrwal
*Assistant Examiner* — Kokou R Detse
(74) *Attorney, Agent, or Firm* — Blue Capital Law Firm, P.C.

(57) ABSTRACT

A method and apparatus for improving beam finding in a wireless communication system. In one embodiment, the method includes the base station detecting a first preamble transmission from a UE on a beam. The method also includes the base station examining extra transmissions to detect whether there are other beams which can be used to communicate with the UE. The method further includes the base station considering a beam set of the UE is complete if a rule is fulfilled, wherein the beam set of the UE includes beam(s) through which the UE could communicate with the base station.

7 Claims, 13 Drawing Sheets

(51) Int. Cl.
 *H04W 24/02* (2009.01)
 *H04W 52/04* (2009.01)
 *H04W 74/00* (2009.01)
 *H04W 88/02* (2009.01)
 *H04W 88/08* (2009.01)

(52) U.S. Cl.
 CPC ... *H04W 72/0473* (2013.01); *H04W 74/0833* (2013.01); *H04W 74/006* (2013.01); *H04W 88/02* (2013.01); *H04W 88/08* (2013.01)

(58) Field of Classification Search
 USPC .......................................................... 370/329
 See application file for complete search history.

(56) References Cited

U.S. PATENT DOCUMENTS

| | | | | |
|---|---|---|---|---|
| 2010/0041428 | A1* | 2/2010 | Chen | H04W 52/16 455/522 |
| 2011/0134837 | A1* | 6/2011 | Wang | H04L 63/101 370/328 |
| 2011/0249656 | A1* | 10/2011 | Cai | H04L 1/0028 370/336 |
| 2012/0320874 | A1 | 12/2012 | Li et al. | |
| 2013/0301567 | A1 | 11/2013 | Jeong | |
| 2014/0177607 | A1 | 6/2014 | Li et al. | |
| 2014/0376466 | A1* | 12/2014 | Jeong | H04W 74/0833 370/329 |
| 2015/0296525 | A1* | 10/2015 | Kim | H04W 16/32 370/329 |
| 2016/0192378 | A1* | 6/2016 | Goodson | H04W 72/1263 370/329 |

OTHER PUBLICATIONS

Notice of Non-Final Rejection from corresponding Korean Patent Application No. 10-2016-0008572, dated Feb. 28, 2017.
European Search Report from the corresponding European Application No. 16152576.1, dated Jun. 22, 2016.
Office Action from corresponding TW Application No. 105102148, dated Dec. 14, 2016.

* cited by examiner

METHOD AND APPARATUS FOR IMPROVING BEAM FINDING IN A WIRELESS COMMUNICATION SYSTEM

CROSS-REFERENCE TO RELATED APPLICATIONS

The present Application claims the benefit of U.S. Provisional Patent Application Ser. No. 62/107,937 filed on Jan. 26, 2015, and U.S. Provisional Patent Application Ser. No. 62/107,945 filed on Jan. 26, 2015, the entire disclosures of which are incorporated herein in their entirety by reference.

FIELD

This disclosure generally relates to wireless communication networks, and more particularly, to a method and apparatus for improving beam finding in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

Furthermore, EU started the METIS project in November 2012 to lay the foundation of 5G, the next generation mobile and wireless communications system. The main technical objectives (or 5G requirements) include the following:

1000 times higher mobile data volume per area;
10 to 100 times higher number of connected devices;
10 to 100 times higher user data rate;
10 times longer battery life for low power massive machine communications (MMC); and
5 times reduced End-to-End latency (<5 ms).

It is clear the above requirements demand much higher system capacity than what can be offered by the legacy systems. Thus, a new radio access technology can be expected to fulfill these requirements.

SUMMARY

A method and apparatus for improving beam finding in a wireless communication system. In one embodiment, the method includes the base station detecting a first preamble transmission from a UE on a beam. The method also includes the base station examining extra transmissions to detect whether there are other beams which can be used to communicate with the UE. The method further includes the base station considering a beam set of the UE is complete if a rule is fulfilled, wherein the beam set of the UE includes beam(s) through which the UE could communicate with the base station.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support the wireless technology discussed in the various documents, including: "DOCOMO 5G White Paper" by NTT Docomo, Inc. Furthermore, the exemplary wireless communication systems devices described below may be designed to support one or more standards such as the standard offered by a consortium named "3rd Generation Partnership Project" referred to herein as 3GPP, including: R2-145410, "Introduction of Dual Connectivity", NTT Docomo, Inc., NEC; TS 36.321 V12.3.0, "E-UTRA MAC protocol specification"; and TS 36.213 V12.3.0, "E-UTRA Physical layer procedures". The standards and documents listed above are hereby expressly incorporated by reference in their entirety.

Figure 1:
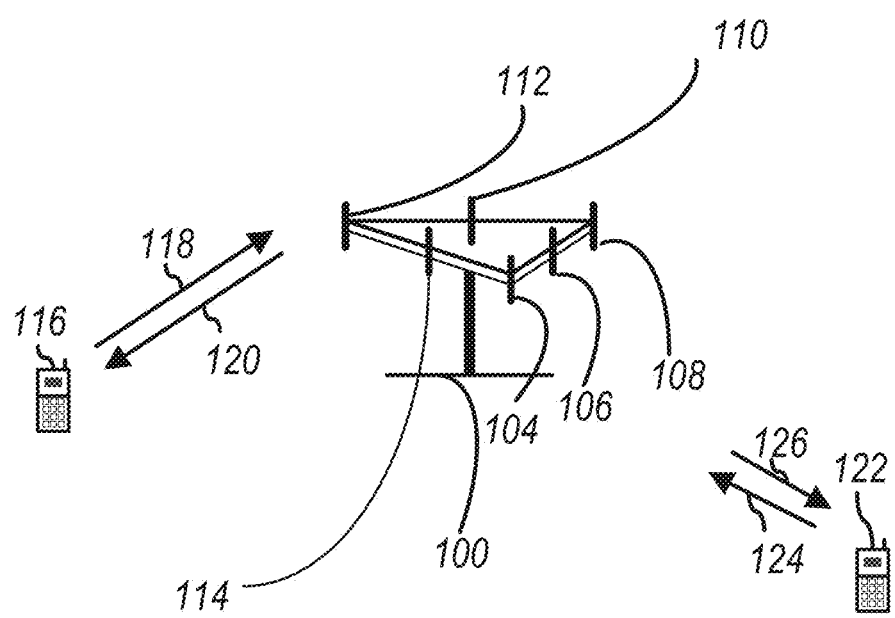
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
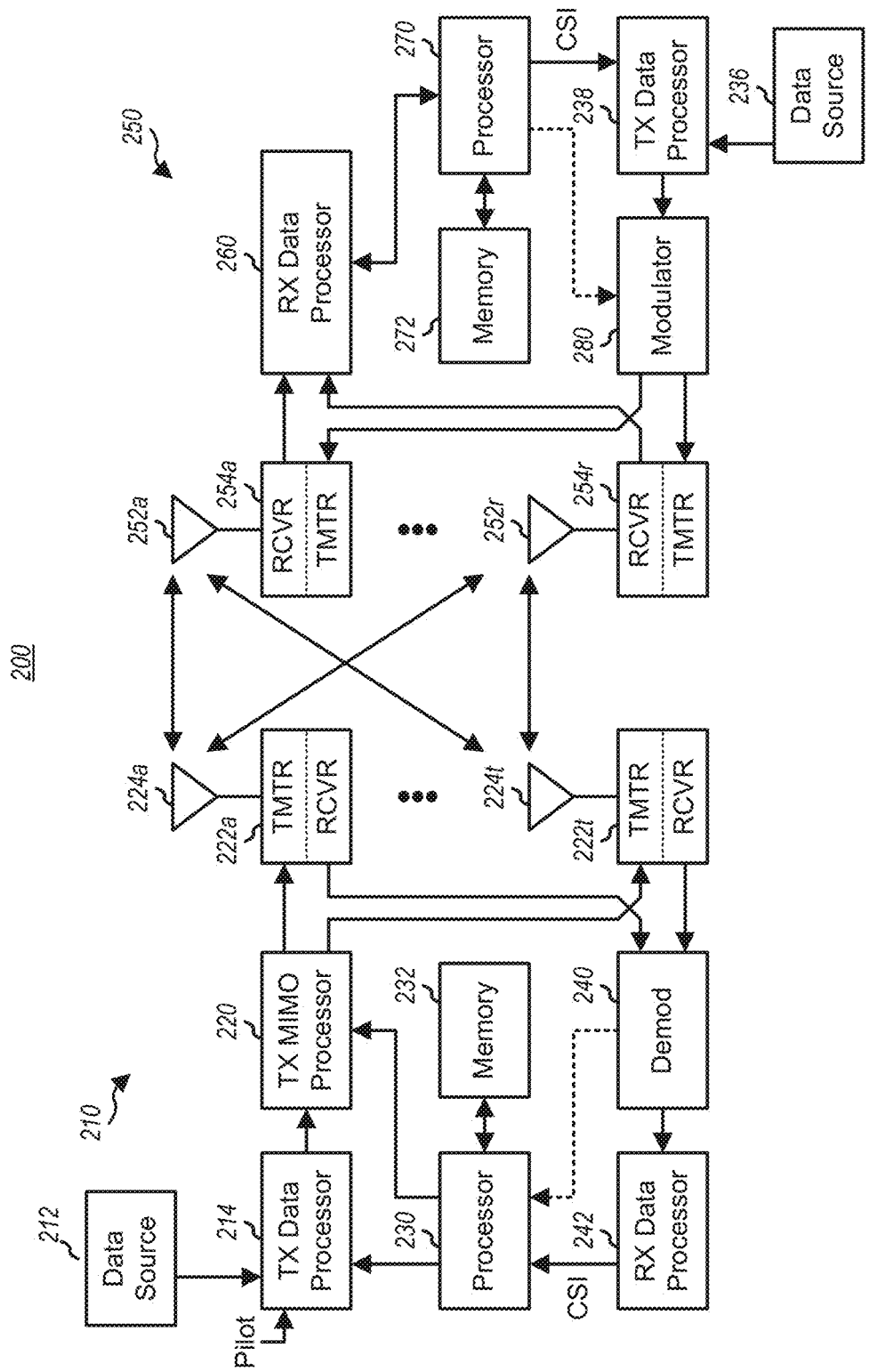
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
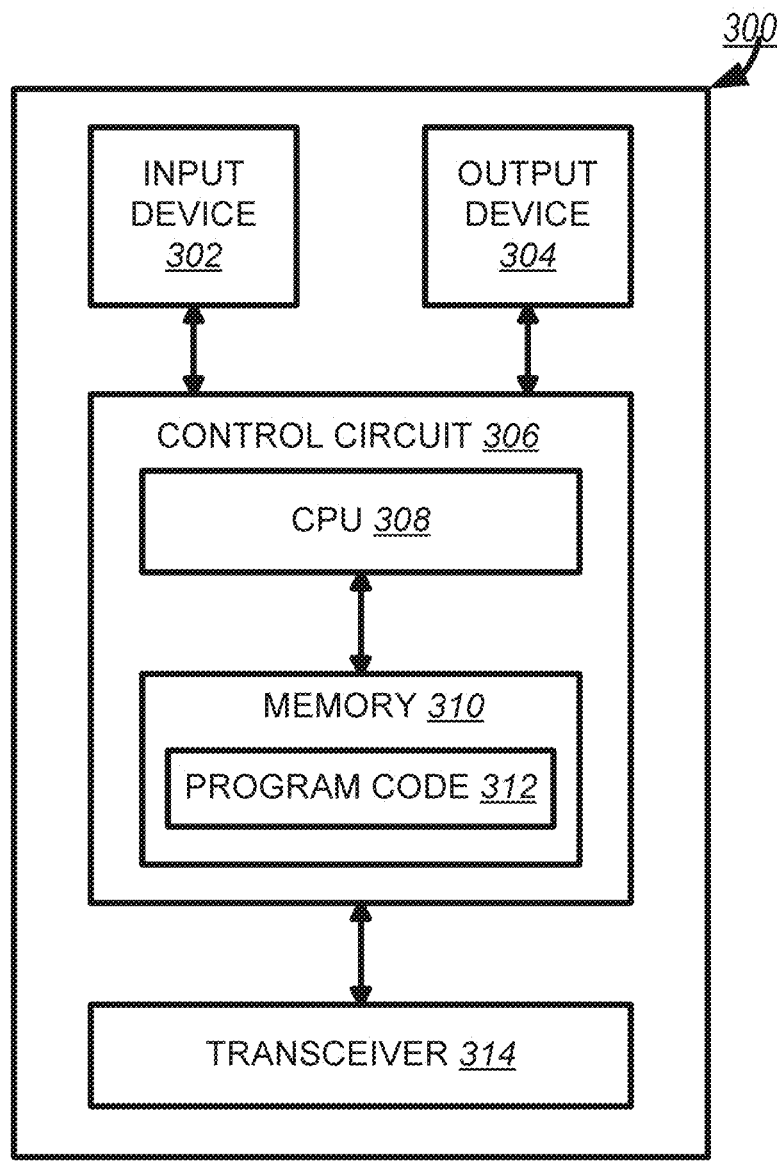
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
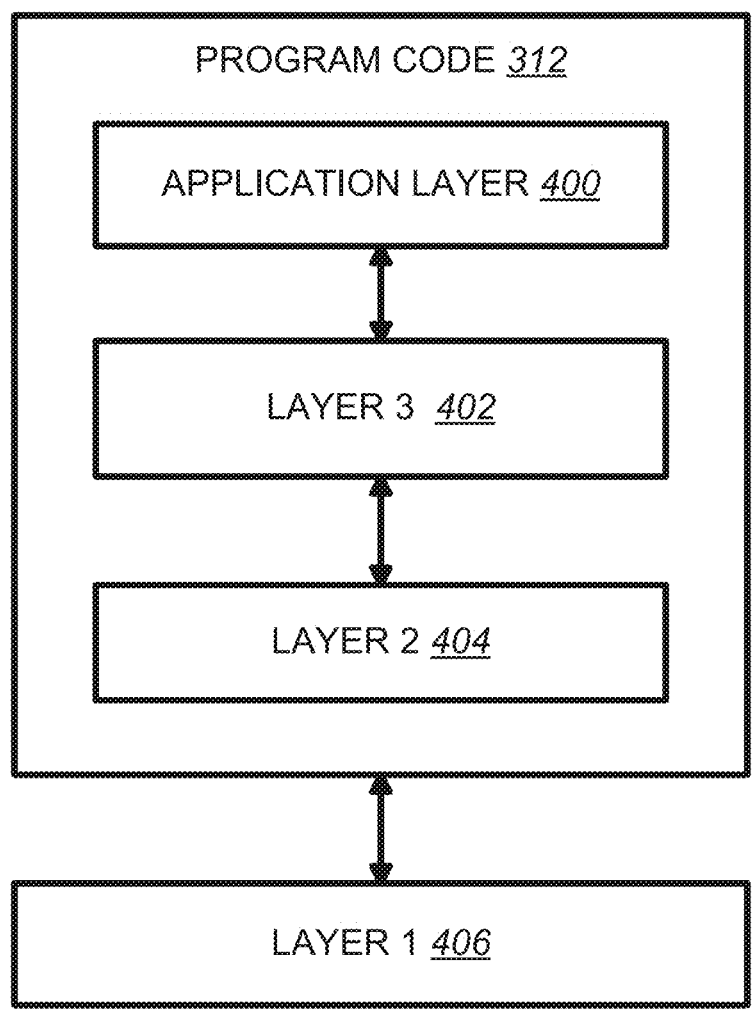
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

The DOCOMO 5G White Paper introduces a 5G radio access concept that efficiently integrates both lower and higher frequency bands. Since higher frequency bands provide opportunities for wider spectrum but have coverage limitations because of higher path loss, it was proposed that a 5G system has a two-layer structure which consists of a coverage layer (e.g., consisting of macro cells) and a capacity layer (e.g., consisting of small cells or phantom cells). The coverage layer uses existing lower frequency bands to provide basic coverage and mobility. The capacity layer uses new higher frequency bands to provide high data rate transmission. The coverage layer could be supported by enhanced LTE RAT (Long Term Evolution Radio Access Technology), while the capacity layer could be supported by a new RAT dedicated to higher frequency bands. Furthermore, integration of the coverage and capacity layers is enabled by the tight interworking (e.g., dual connectivity) between the enhanced LTE RAT and the new RAT.

Dual connectivity is a mode of operation for a UE (User Equipment) in RRC_CONNECTED, configured with a Master Cell Group and a Secondary Cell Group as discussed in 3GPP R2-145410. A Master Cell Group is a group of serving cells associated with the MeNB (Master Evolved Node B), comprising of the PCell (Primary Cell) and optionally one or more SCell (Secondary Cell). A Secondary Cell Group is a group of serving cells associated with the SeNB (Secondary Evolved Node B), comprising of a SpCell (Special Cell) and optionally one or more SCell (Secondary Cell). A UE configured with dual connectivity generally means that the UE is configured to utilize radio resources that are provided by two distinct schedulers, and located in two eNBs (MeNB and SeNB) connected via a non-ideal backhaul over the X2 interface. Furthermore, C-plane messages are communicated via MeNB. Further details of dual connectivity can be found in 3GPP R2-145410.

In dual connectivity, a random access (RA) procedure may be performed upon SCG (Secondary Cell Group) addition/modification if instructed, upon DL (downlink) data arrival during RRC_CONNECTED requiring random access procedure (e.g., when UL (uplink) synchronization status is non-synchronised), or upon UL data arrival during RRC_CONNECTED requiring random access procedure (e.g., when UL synchronisation status is non-synchronised or when there is no resource for SR (Scheduling Request) available). A random access initiated b the UE is performed only on PSCell for SCG.

Figure 5:
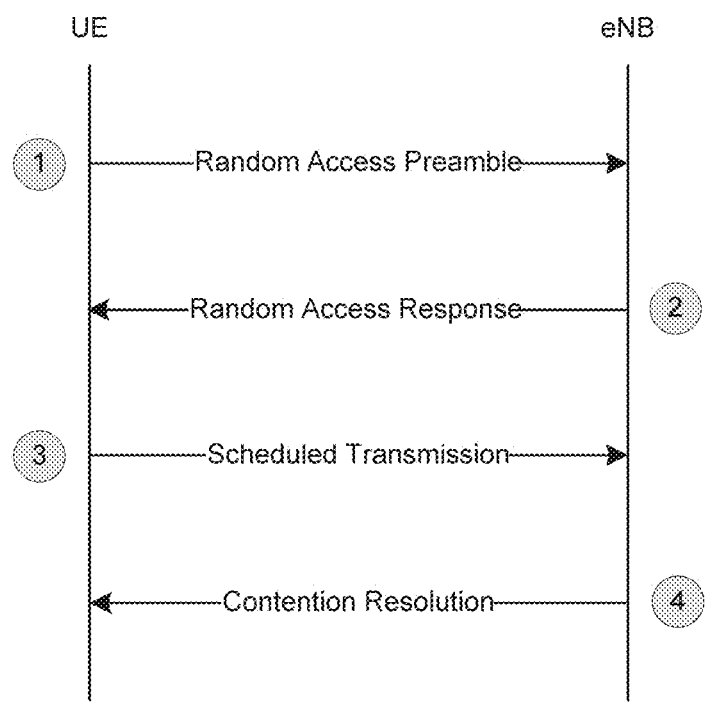
FIG. 5 illustrates a contention-based Random Access procedure.

There are two different types of RA procedures: contention-based RA and contention-free RA. A contention based RA procedure is shown in FIG. 5 and includes the following four steps:

1. Random Access Preamble is transmitted by UE on RACH (Random Access Channel), and is mapped to PRACH (Physical Random Access Channel);
2. Random Access Response is received from eNB on DL-SCH (Downlink Shared Channel), and is mapped to PDSCH (Physical Uplink Shared Channel);
3. Scheduled Transmission is transmitted by UE on UL-SCH (Uplink-Shared Channel), and is mapped to PUSCH (Physical Uplink Shared Channel); and
4. Contention Resolution is received from eNB on PDCCH (Physical Downlink Control Channel) or on DL-SCH, and is mapped to PDSCH.

Figure 6:
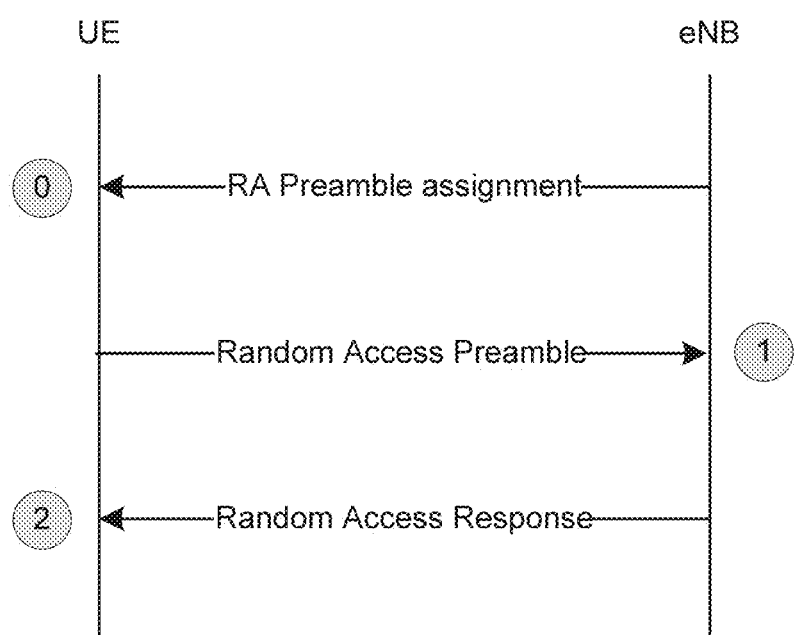
FIG. 6 illustrates a contention-free Random Access procedure.

A contention-free RA procedure is shown in FIG. 6 and includes the following three steps:

1. Random Access Preamble assignment is received from eNB (evolved Node B);
2. Random Access Preamble is transmitted by UE on UL-SCH (Uplink-Shared Channel), and is mapped to PUSCH; and
3. Random Access Response is received from eNB on DL-SCH (Downlink Shared Channel), and is mapped to PDSCH.

After transmitting a RA preamble, a UE shall monitor a PDCCH for RA response(s) from an eNB (i.e., a base station) in a RA response window, which starts at the subframe (or TTI (Transmission Time Interval)) that contains the end of the preamble transmission plus three subframes and has length ra-ResponseWindowSize subframes, as discussed in 3GPP TS 36.321 V12.3.0. If the does not receive a valid RA response from the eNB within the RA response window, the UE shall retransmit a RA preamble until the maximum number of retransmissions has been reached or a valid RA response is received. Thus, it might take more than one run to complete a RA procedure. Details of a RA procedure can be found in 3GPP R2-145410 and TS 36.321 V12.3.0.

Furthermore, as discussed in 3GPP TS 36.213 V12.3.0, the power control of random access procedure is properly defined to improve robustness and efficiency. The power of preamble would be increased from attempt to attempt, also known as power ramping, if the preamble attempts have not yet succeeded. In addition, once a preamble attempt succeeds, the power level of that preamble attempt would be used to derive the power of the following uplink transmission (e.g., PUSCH, PUCCH or reference signals). More details on this aspect can be found in 3GPP TS 36.213 V12.3.0.

Furthermore, cells on the capacity layer may use beam forming. In general, beam forming is a signal processing technique used in antenna arrays for directional signal transmission or reception. This is achieved by combining elements in a phased array in such a way that signals at particular angles experience constructive interference while others experience destructive interference. Beam forming can be used at both the transmitting and receiving ends in order to achieve spatial selectivity. The improvement compared with omnidirectional reception/transmission is known as the receive/transmit gain.

Beam forming is frequently applied in radar systems. The beam created by a phased array radar is comparatively narrow and highly agile compared to a moving dish. This characteristic gives the radar the ability to detect small, fast targets like ballistic missiles in addition to aircrafts.

The benefit of co-channel interference reduction also makes beam forming attractive to a mobile communication system designer. U.S. Patent Publication No. 2010/0165914 generally discloses the concept of beam division multiple access (BDMA) based on beam forming technique. In BDMA, a base station can communicate with a UE via a narrow beam to obtain the receive/transmit gain. It is also possible for the base station to communicate with a UE using multiple beams if these beams are qualified. Besides, two UEs in different beams can share the same radio resources at the same time and thus the capacity of a mobile communication system can increase greatly. To achieve that, the base station should know in which beam(s) a UE can communicate with the base station.

A beam set of a UE is generally the beam(s) through which the UE could communicate with the base station. To fully utilize the benefit of BDMA (Beam Division Multiple Access), the base station has to know the beam set of the UE. One way of finding the beam set of a UE is to detect uplink transmission from that UE. For example, when UE perform a RA procedure, eNB may detect preamble(s) from a UE on each beam to know the signal from the UE would arrive on which beam. It is possible that not all the beams where signal can be observed from a UE would be considered as being in the beam set of the UE. It is also possible to remove weak beam(s) which is inefficient to use or which would cause negligible interference to other UE on that beam(s).

As a result, a criterion may be defined to judge whether a beam is qualified as a beam set of a UE. An example can be a beam with a signal strength that is 20 dB lower than the signal strength of the strongest beam of the UE would not be considered as a qualified beam, and would not be included in the UE's beam set. On the other hand, a beam with a signal strength that is 15 dB lower than signal strength of the strongest beam of the UE would be considered a qualified beam, and would be included in the UE's beam set. In other words, a signal strength threshold may be defined to determine whether a particular beam should be included in the UE's beam set.

A base station or a cell may not utilize all available beams at the same time due to hardware limitation. If there is such hardware limitation, more transmissions would be needed to scan all the beams of a cell to find out the beam set of a UE. As an example, a cell has 9 beams in total and can generate transmit/receive) three beams at the same time. First, beams 1, 4, and 7 are generated. Then beams 2, 5, and 8 are generated. Finally, beams 3, 6, and 9 are generated. To scan all the beams of the cell, the UE would need to conduct transmissions on three occasions or transmission opportunities. The following discussion/solution could be applied to the case when there is such hardware limitation as well as to the case when there is no such hardware limitation.

When base station detects a preamble on one beam from a UE, not all qualified beam could be detected within the same attempt(s) (e.g., due to insufficient power or channel condition on certain beam). In some cases, multiple preamble attempts with the same power level may be needed to scan and find all the beams of a cell when the cell has a limited number of generated beams. In addition, the preamble power would increase from attempt to attempt, while the current power level of the preamble may lead to successful detection of some beam and unsuccessful detection of other beams. For example, stronger beams would be detected earlier while weaker beams that qualify would not be detected. The base station generally needs a strategy to judge or determine whether the beam finding is finished or not. Furthermore, the UE would need to assist the base station in making such judgment or determination.

Figure 7:
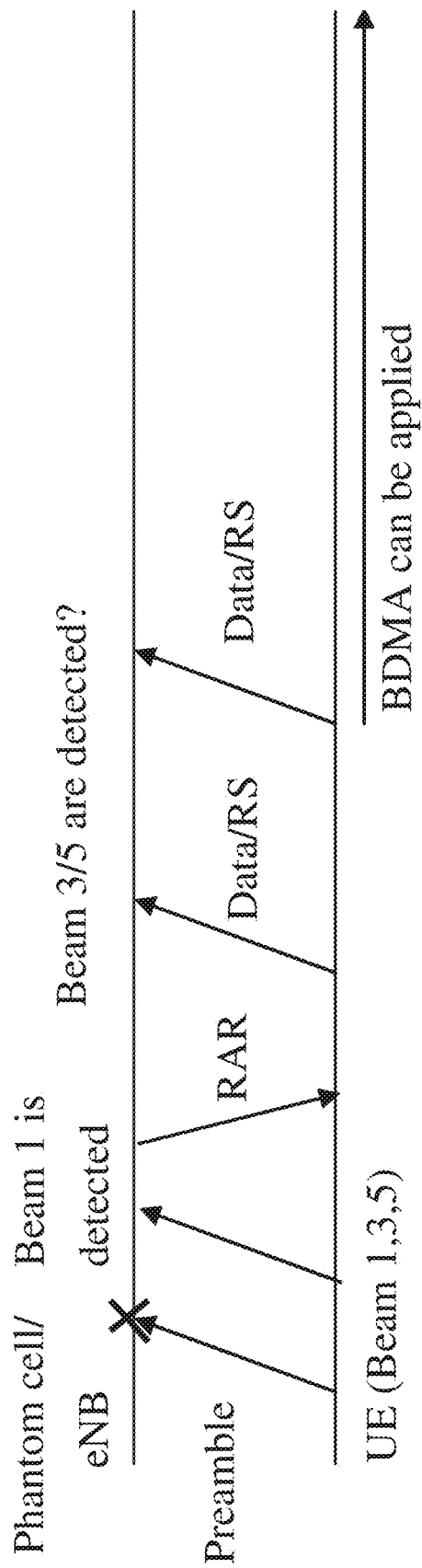
FIG. 7 illustrates a first strategy according to one exemplary embodiment to determine whether a beam set of a UE is complete or a beam finding procedure is finished.

In general, to determine whether a beam set of a UE is complete or a beam finding procedure is finished, the following strategies could be considered independently or jointly:

Strategy 1—Once the preamble of a UE is detected on any of the beams in the earliest attempt (i.e., the first successful preamble detection), eNB transmits RAR to finish the random access procedure, even if the beam set may not be complete. After the random access procedure, UE would perform some data or reference signal (RS) transmissions while the beam set of the UE has not yet been determined and BDMA may not be applied. The eNB would then examine the data/RS transmissions to ensure (or determine) whether there is any qualified beam whose preamble was not detected. The data/RS transmissions may be triggered by the RAR or by other signaling. The number of data/RS transmissions may be fixed or configurable. Alternatively, a signaling could be used to terminate the data/RS transmissions to complete beam set, and in the following nominal data/RS transmissions are performed. After eNB examines the data/RS transmissions and considers (or determines) that the beam set is complete, BDMA could then be applied. FIG. 7 illustrates an example of Strategy 1.

Figure 8:
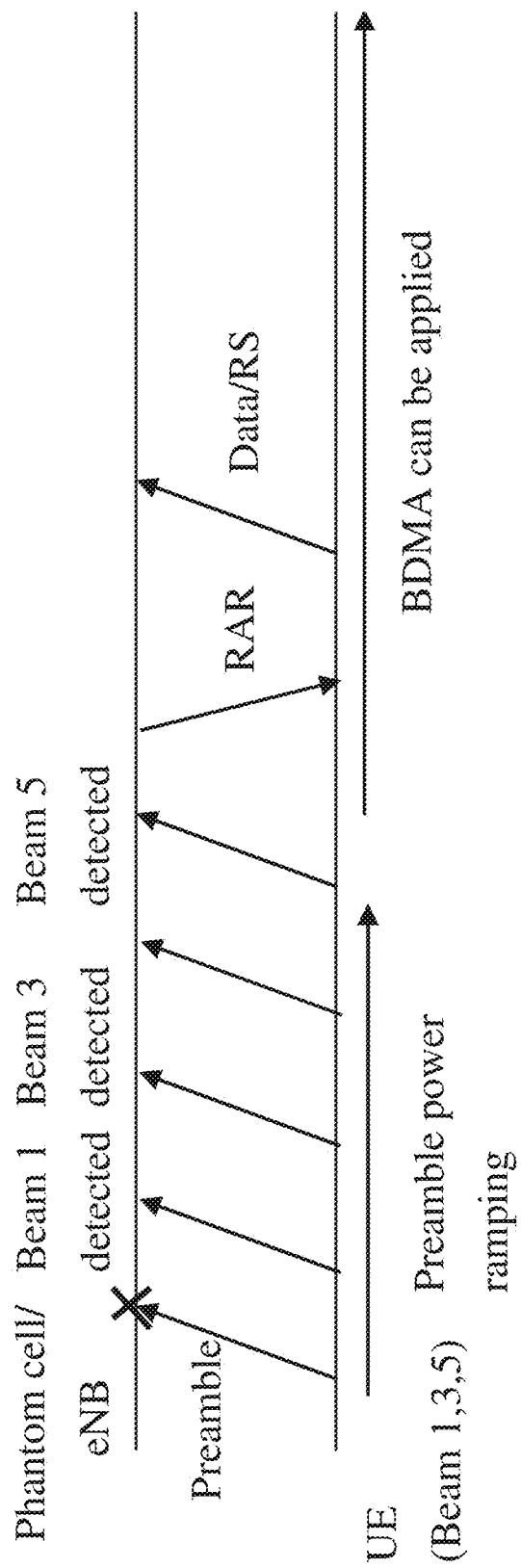
FIG. 8 illustrates a second strategy according to one exemplary embodiment to determine whether a beam set of a UE is complete or a beam finding procedure is finished.

Strategy 2—When the preamble of a UE is detected on any of the beams (i.e., the first successful preamble detection), eNB does not transmit corresponding RAR. Instead, eNB continues to detect preamble to find out whether there is any undetected qualified beam. When eNB considers (or determines) that the beam set is complete, eNB could send a RAR to finish the random access procedure, BDMA could be applied afterward. FIG. 8 illustrates an example of Strategy 2.

Figure 9:
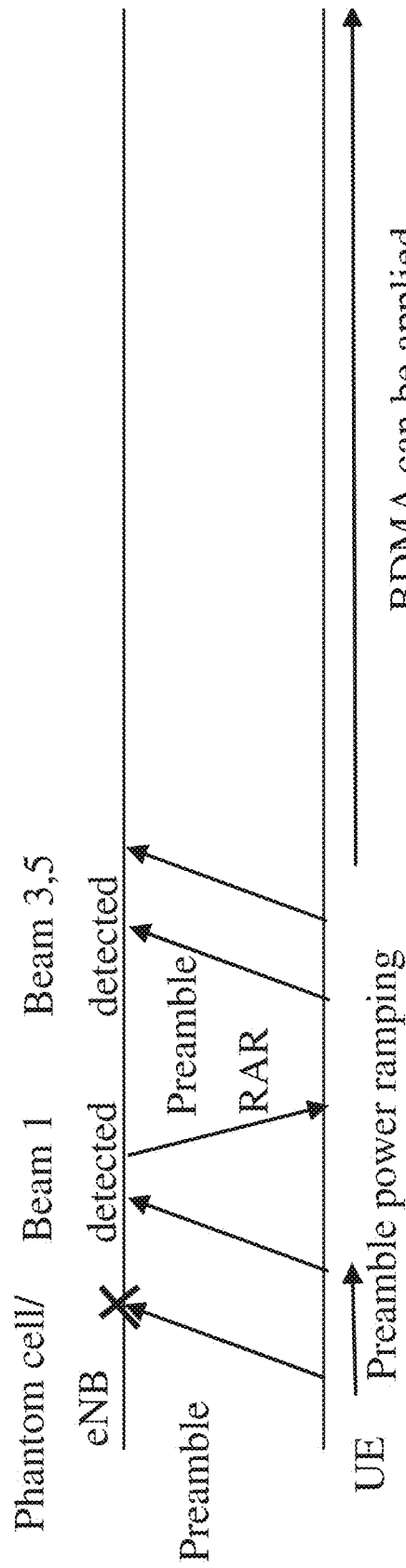
FIG. 9 illustrates a third strategy according to one exemplary embodiment to determine whether a beam set of a UE is complete or abeam finding procedure is finished.

Strategy 3—Once the preamble of a UE is detected on any of the beams in the earliest attempt (i.e., the first successful preamble detection), eNB would transmit RAR to the UE, even if the beam set may not be complete. The UE would then transmit several additional preamble transmissions while the beam set of the UE has not yet been determined and BDMA may not be applied. Based on the additional preamble transmissions, eNB may be able to ensure (or determine) whether there is any qualified beam whose preamble was not detected. The preamble transmissions may be terminated by another RAR. Furthermore, the number preamble transmissions could be fixed or configurable. After examining the preamble transmissions, eNB could consider that the beam set is complete; and BDMA could be applied afterward. FIG. 9 illustrates an example of Strategy 3.

In any of the three strategies, after the first successful preamble detection, several extra transmissions of preamble, data, and/or RS are required to allow eNB to make sure the beam set of a UE is complete. Furthermore, rules would be required for eNB to decide whether the beam set is complete.

In one embodiment, the rule could be the total number of extra transmissions. For example, after five extra transmissions, eNB would consider that the beam set is complete. The qualified beam(s) detected during the preamble transmissions and the extra transmissions would be included in the beam set of the UE.

In another embodiment, the rule could the number of transmissions after a new qualified beam is detected. For example, when a new qualified beam is detected in a preamble transmission or in an extra transmission and there is no new qualified beam detected after three additional extra transmissions, eNB would consider that the beam set is complete. The qualified beam detected during the preamble transmissions and the extra transmissions would be included in the beam set of the UE.

In another embodiment, the rule could be whether difference between the transmission power of the first successful preamble detection and the transmission power of an extra transmission exceeds a threshold. For example, when the difference between the transmission power of the first successful preamble detection and the transmission power of an extra transmission exceeds 20 dB, eNB would consider that the beam set is complete. The qualified beam(s) detected during the preamble transmissions and the extra transmissions would be included in the beam set of the UE.

In another embodiment, the rule could be when a newly detected beam is not a qualified beam, eNB would consider that the beam set is complete. The qualified beam(s) detected during the preamble transmissions and the extra transmissions would be included in the beam set of the UE.

In another embodiment, the rule could be when the quality of a newly detected beam is worse than certain level, eNB would consider that the beam set is complete. For example, when the strength of a newly detected beam is 20 dB lower than the strongest beam, eNB would consider that the beam set is complete. The qualified beam(s) detected during the preamble transmissions and the extra transmissions would be included in the beam set of the UE.

In general, if the cell has a limitation on the number of beams, the extra transmissions may need to be performed several times so that all the beams of the cell could be scanned. The rules discussed in the above embodiments has to be fulfilled at least once.

For Strategies 1 and 3, several extra transmissions would continue after receiving RAR. Whether the base station could detect all the qualified beams may depend on the power level of the extra transmissions. According to current power control mechanism discussed in 3GPP TS 36.213 V12.3.30 (e.g., power ramping for preamble or transmission power control (TPC) command for other signals), some latency would be introduced for the extra transmission to achieve certain power (e.g., 20 dB higher) which is not efficient.

For Strategies 1, 2, and 3, after the several extra transmission, nominal data transmission could be performed while the power level may be higher than what is required. For example, in Strategy 2, the power derived from the first received preamble may be sufficient for nominal data transmission while several power rampings are performed for completing the beam set and several TPC commands to reduce the transmission power are required to resume the nominal transmission power.

For Strategies 1 and 3, the general concept of the invention is that after receiving RAR, an additional power offset or larger power step would be taken into account for the extra transmissions. Furthermore, when the extra transmissions finish, the power would resume to the nominal level (i.e., the additional power offset/step would not be taken into account). For Strategy 2, the general concept of the invention is to reduce the power immediately upon receiving the RAR. The base station would let the know how many additional preambles are transmitted after the first successful preamble detection. The UE would derive power from the power of the transmission of the first preamble that was detected on any of the beams.

In one embodiment, the UE would receive a RAR, and would transmit an extra transmission with an additional power offset. When the extra transmission finishes, the additional power offset would be reduced from the transmission power.

In another embodiment, a UE receives a RAR which includes the number of additional preambles after the first success preamble detection; and UE derives power from the power of the transmission of first preamble that was detected on any of the beams.

In another embodiment, there are different TPC (Transmit Power Control) command ranges in RAR for different random access procedures. The different ranges could be configured by the base station. A larger TPC command range could be applied for a phantom cell. Furthermore, a larger TPC command range could be applied for random access procedure for beam finding.

Figure 10:
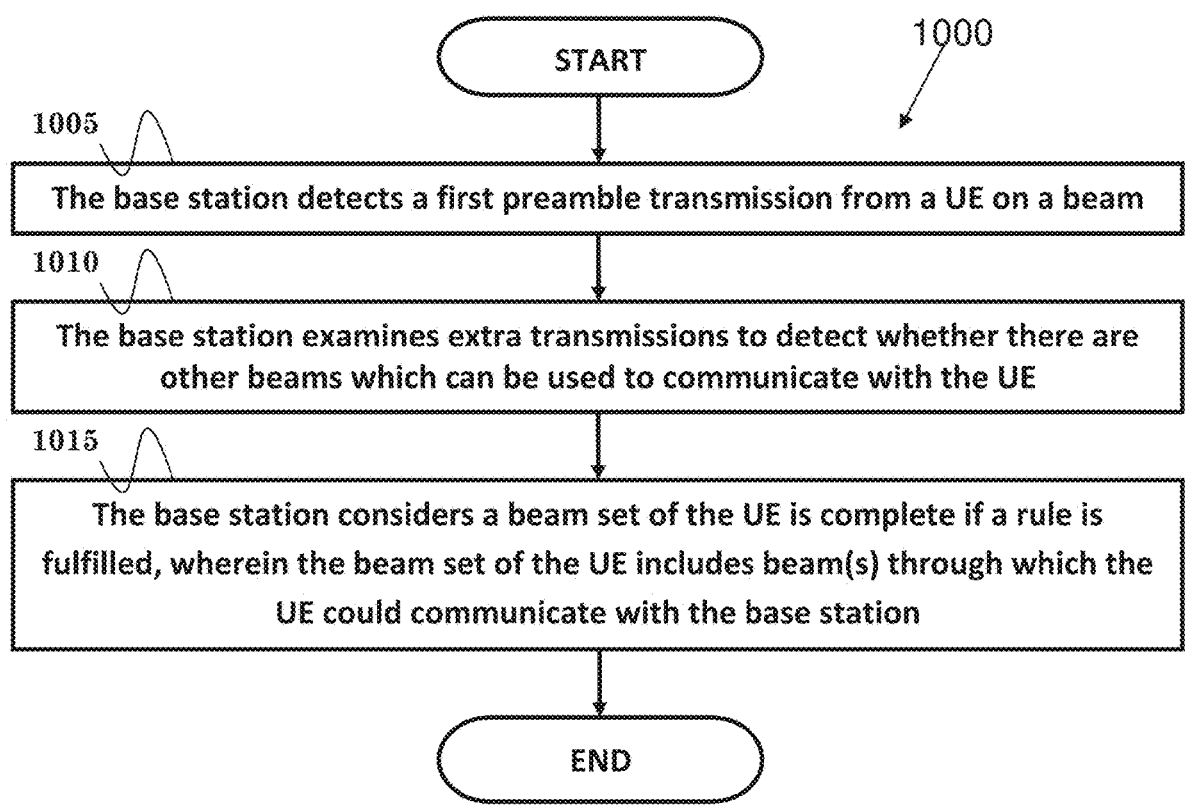
FIG. 10 is a flow chart according to one exemplary embodiment.

FIG. 10 is a flow chart 1000 from the perspective of a base station in accordance with one exemplary embodiment. In step 1005, the base station detects a first preamble transmission from a UE on a beam. In step 1010, the base station examines extra transmissions to detect whether there are other beams which can be used to communicate with the UE. In step 1015, the base station considers a beam set of the UE is complete if a rule is fulfilled, wherein the beam set of the UE includes beam(s) through which the UE could communicate with the base station. In one embodiment, the base station considers that the beam set of the UE is complete when all qualified beams of the UE have been found.

In one embodiment, the rule is based on a total number of extra transmissions. More specifically, the rule could be based on a number of extra transmissions after a new qualified beam has been detected.

Alternatively, the rule could be based on a power difference between a transmission power of the first preamble and a transmission power of an extra transmission. The rule could also be based on a quality of a newly detected beam from an extra transmission. Furthermore, the rule could be based on whether a difference of strength of the newly detected beam and strength of the strongest beam reaches a certain value. In addition, the rule could be based on whether a newly detected beam has a quality above a threshold.

Referring back to FIGS. 3 and 4, in one embodiment from the perspective of a base station, the device 300 includes a program code 312 stored in memory 310 of the transmitter. The CPU 308 could execute program code 312 (i) to detect a first preamble transmission from a UE on a beam, (ii) to examine extra transmissions to detect whether there are other beams which can be used to communicate with the UE, and (iii) to consider a beam set of the UE is complete if a rule is fulfilled, wherein the beam set of the UE includes beam(s) through which the UE could communicate with the base station. In addition, the CPU 308 can execute the program code 312 to perform all of the above-described actions and steps or others described herein.

Figure 11:
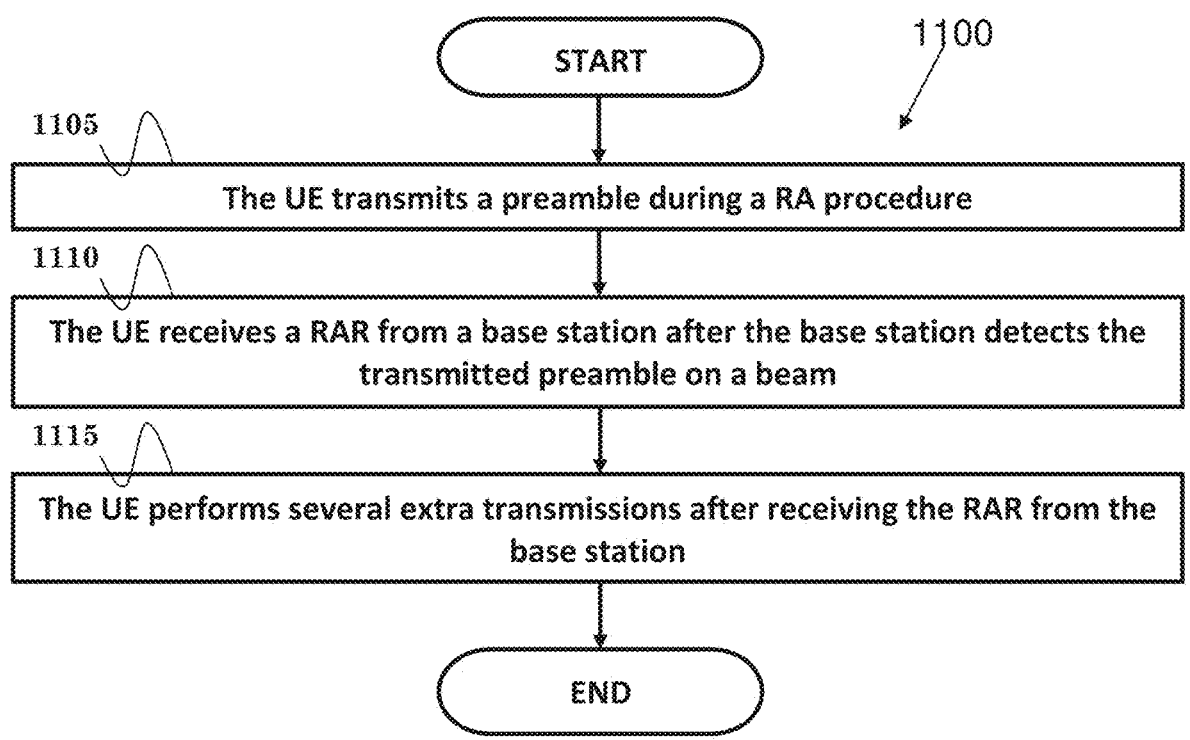
FIG. 11 is a flow chart according to one exemplary embodiment.

FIG. 11 is a flow chart 1100 from the perspective of a UE in accordance with one exemplary embodiment. In step 1105, the UE transmits a preamble during a RA procedure. In step 1110, the UE receives a RAR from a base station after the base station detects the transmitted preamble on a beam. In step 1115, the UE performs several extra transmissions after receiving the RAR from the base station. In one embodiment, the number of extra transmissions could be fixed or configurable. Furthermore, the extra transmissions could be terminated by a signaling from the base station or by another RAR from the base station.

Referring back to FIGS. 3 and 4, in one embodiment from the perspective of a UE, the device 300 includes a program code 312 stored in memory 310 of the transmitter. The CPU 308 could execute program code 312 (i) to transmit a preamble during a RA procedure, (ii) to receive a RAR from a base station after the base station detects the transmitted preamble on a beam, and (iii) to perform several extra transmissions after receiving the RAR from the base station. Furthermore, the CPU 308 can execute the program code 312 to perform all of the above-described actions and steps or others described herein.

Figure 12:
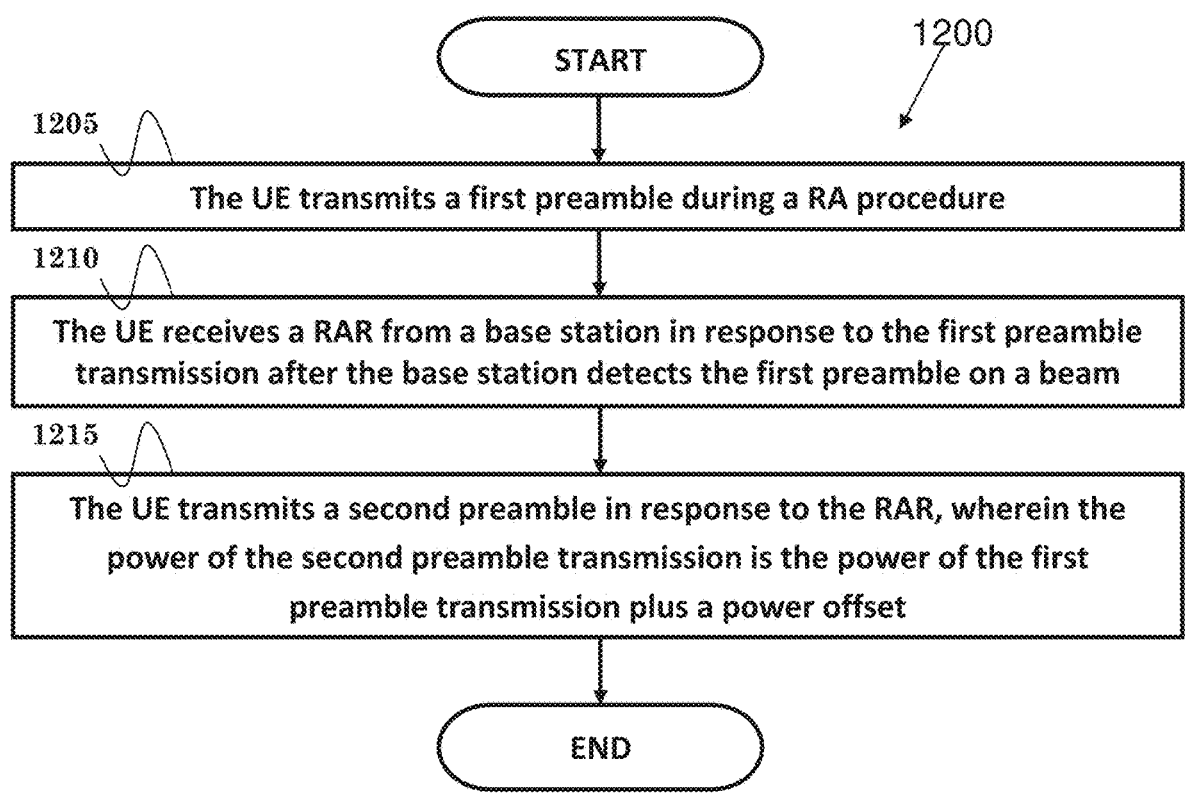
FIG. 12 is a flow chart according to one exemplary embodiment.

FIG. 12 is a flow chart 1200 from the perspective of a UE in accordance with one exemplary embodiment. In step 1205, the UE transmits a first preamble during a RA procedure. In step 1210, the UE receives a RAR from a base station in response to the first preamble transmission after the base station detects the first preamble on a beam. In step 1215, the UE transmits a second preamble in response to the RAR, wherein the power of the second preamble transmission is the power of the first preamble transmission plus a power offset. In one embodiment, the power offset is different from a ramping step.

Referring back to FIGS. 3 and 4, in one embodiment from the perspective of a UE, the device 300 includes a program code 312 stored in memory 310 of the transmitter. The CPU 308 could execute program code 312 (i) to transmit a first preamble during a RA procedure, (ii) to receive a RAR from a base station in response to the first preamble transmission after the base station detects the first preamble on a beam, and (iii) to transmit a second preamble in response to the RAR, wherein the power of the second preamble transmission is the power of the first preamble transmission plus a power offset. Furthermore, the CPU 308 can execute the program code 312 to perform all of the above-described actions and steps or others described herein.

Figure 13:
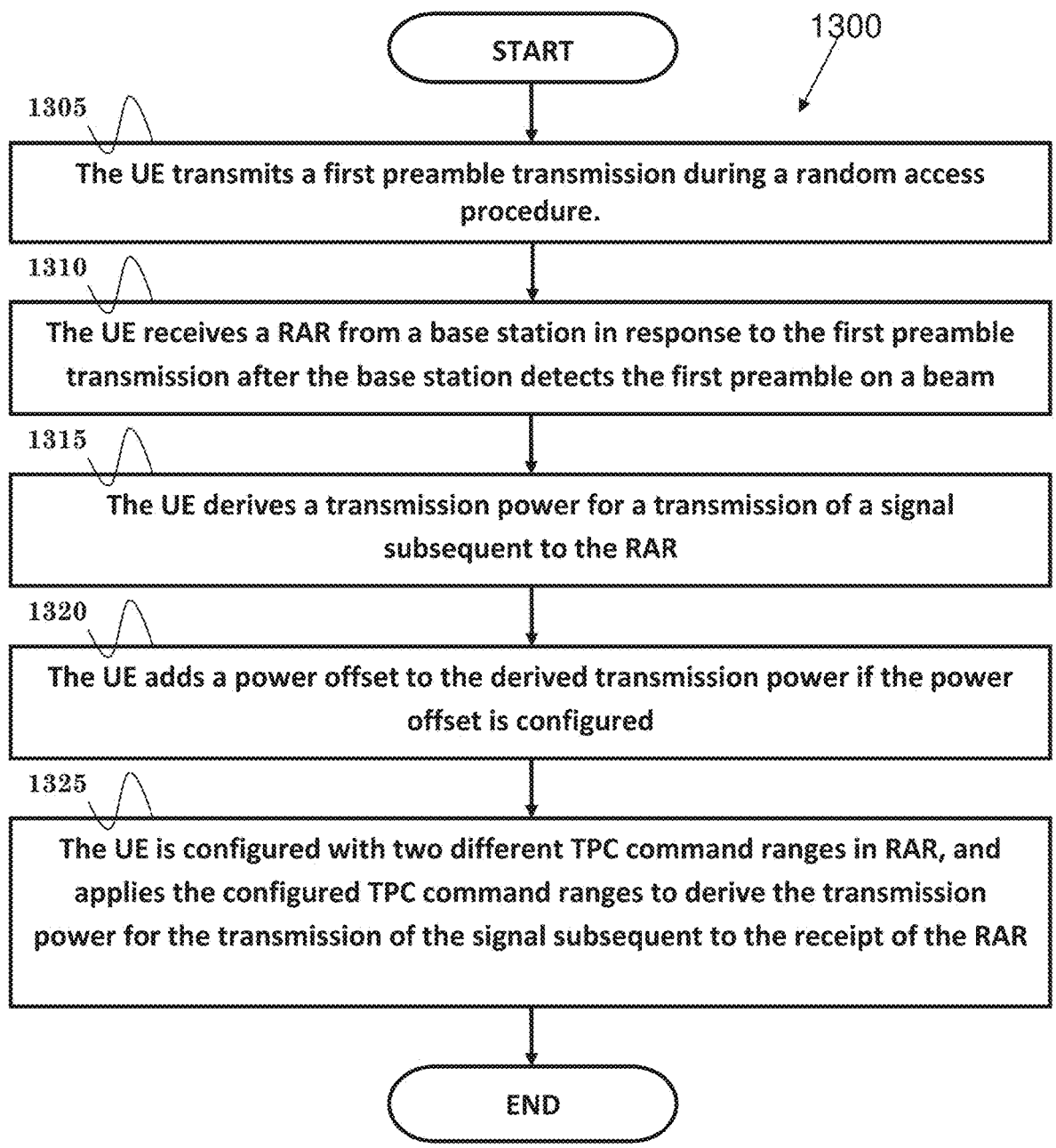
FIG. 13 is a flow chart according to one exemplary embodiment.

FIG. 13 is a flow chart 1300 from the perspective of a UE in accordance with one exemplary embodiment. In step 1305, the UE transmits a first preamble transmission during a random access procedure. In step 1310, the UE receives a RAR from a base station in response to the first preamble transmission after the base station detects the first preamble on a beam. In step 1315, the UE derives a transmission power for a transmission of a signal subsequent to the RAR. In one embodiment, the UE derives the transmission power based on ramping step information included in the RAR, and the ramping step information includes how many ramping steps should be reduced to derive the transmission power.

In step 1320, the UE adds a power offset to the derived transmission power if the power offset is configured. In one embodiment, the power offset could be reduced from the derived transmission power if the signal has been transmitted for a certain number of times. The power offset could also be reduced from the derived transmission power if the UE receives an indication from the base station to reduce the derived transmission power. In one embodiment, the power offset is applied for transmissions for beam finding or for beam tracking, and is not applied for data transmissions.

In step 1325, the UE is configured with two different TPC (Transmit Power Control) command ranges in RAR, and applies the configured TPC command ranges to derive the transmission power for the transmission of the signal subsequent to the receipt of the RAR. In one embodiment, the different TPC command ranges are configured for different purposes of performing RA procedure.

Referring back to FIGS. 3 and 4, the device 300 includes a program code 312 stored in memory 310. The CPU 308 could execute program code 312 (i) to transmit a first preamble transmission during a random access procedure, (ii) to receive a RAR from a base station in response to the first preamble transmission after the base station detects the first preamble on a beam, and (iii) to derive a transmission power for a transmission of a signal subsequent to the RAR.

In one embodiment, the CPU 308 could further execute program code 312 to add a power offset to the derived transmission power if the power offset is configured. The CPU 308 could also execute program code 312 to apply configured TPC command ranges to derive the transmission power for the transmission of the signal subsequent to the receipt of the RAR. In addition, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a base station, comprising:
   the base station detects a first preamble transmission from a UE (User Equipment) on at least one beam;
   the base station transmits a Random Access Response (RAR) to the UE in response to reception of the first preamble;
   after transmitting the RAR, the base station continues to examine extra transmissions from the UE to determine whether there are other beams which can be used to communicate with the UE; and
   the base station considers a beam set of the UE is complete if a total number of extra transmissions from the UE reaches a pre-configured value, wherein the beam set of the UE includes beam(s) through which the UE could communicate with the base station.

2. The method of claim 1, wherein the base station considers that the beam set of the UE is complete when all beams which can be used for communicating with the UE have been found.

3. The method of claim 1, wherein a beam is included in the beam set of the UE if a signal strength received from the beam is greater than a threshold.

4. A method of a UE (User Equipment), comprising:
   the UE transmits a preamble during a random access (RA) procedure for the base station to determine at least one beam for communicating with the UE;
   the UE receives a RAR (Random Access Response) from a base station after the base station detects the transmitted preamble on a beam; and
   the UE performs several extra transmissions to the base station after receiving the RAR from the base station so that the base station could examine the extra transmissions to detect whether there are other beams which can be used to communicate with the UE.

5. The method of claim 4, wherein a total number of extra transmissions could be fixed or configurable.

6. The method of claim 4, wherein the UE stops the extra transmissions when a specific signaling is received from the base station.

7. A Base station (BS), comprising:
   a control circuit;
   a processor installed in the control circuit; and
   a memory installed in the control circuit and operatively coupled to the processor;
   wherein the processor is configured to execute a program code stored in the memory to:
      detect a first preamble transmission from a UE (User Equipment) on at least one beam;
      transmit a Random Access Response (RAR) to the UE in response to reception of the first preamble;
      after transmitting the RAR, continue to examine extra transmissions from the UE to determine whether there are other beams which can be used to communicate with the UE; and
      consider a beam set of the UE is complete if a total number of extra transmissions from the UE reaches a pre-configured value, wherein the beam set of the UE includes beam(s) through which the UE could communicate with the base station.

* * * * *